April 7, 1959 H. A. ROAN 2,880,711
VARIABLE VALVE TIMING MECHANISM FOR ENGINES
Filed Feb. 5, 1958 3 Sheets-Sheet 2
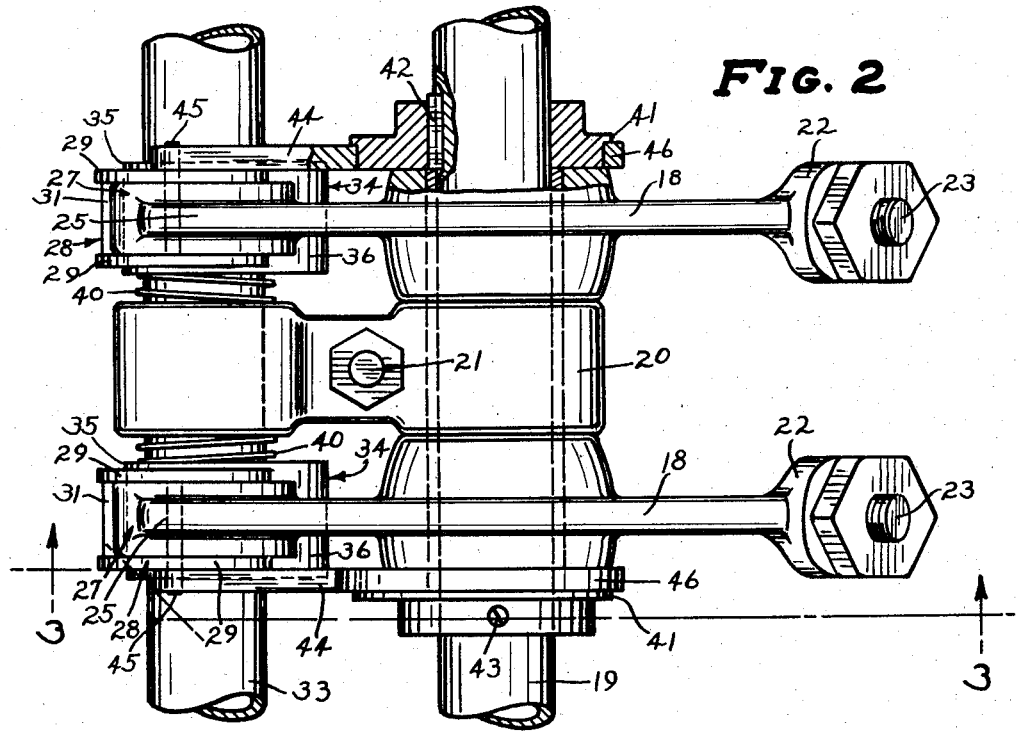
Fig. 2
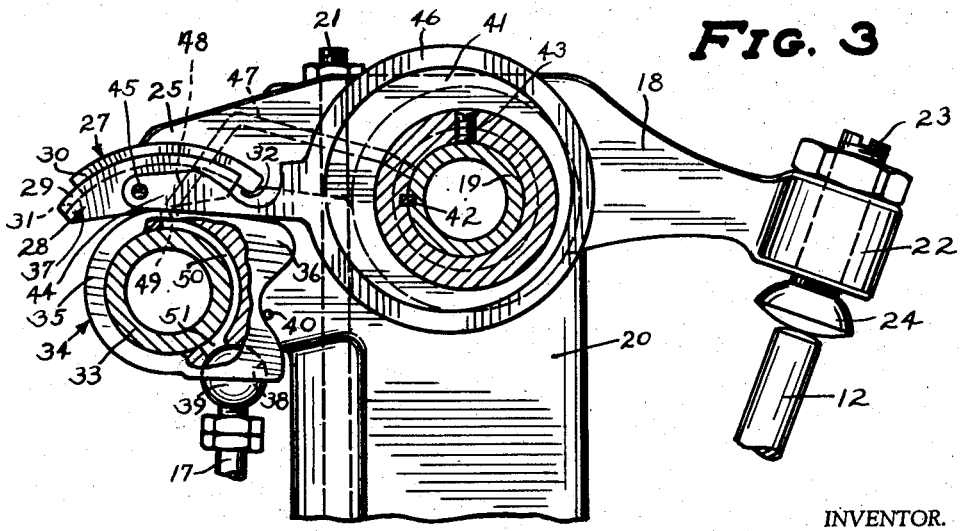
Fig. 3
INVENTOR.
Henry A. Roan
BY
ATTORNEYS

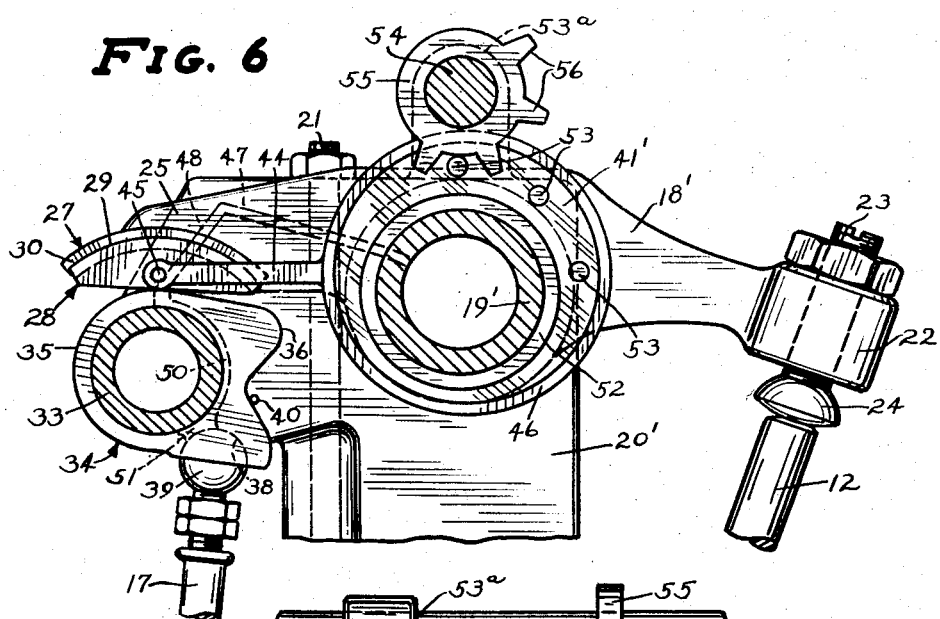
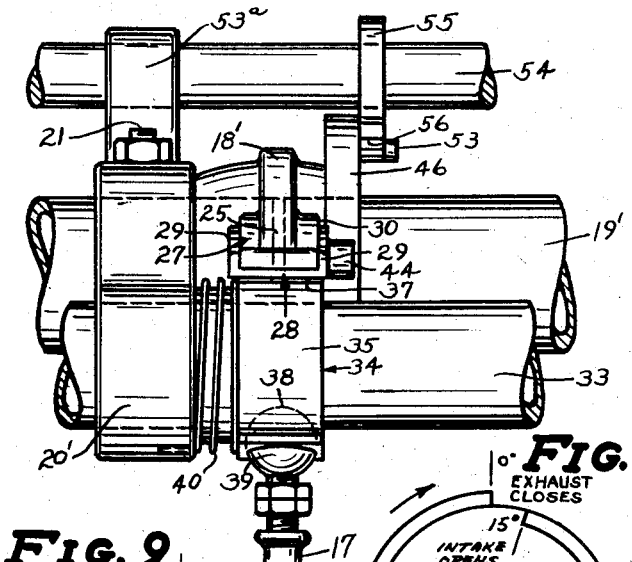
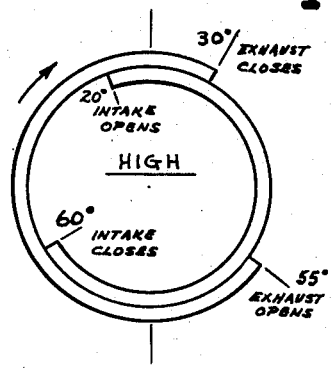
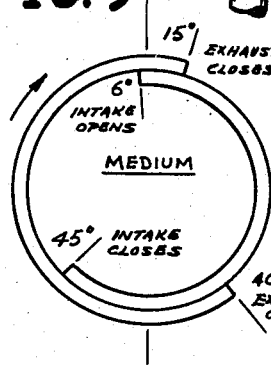
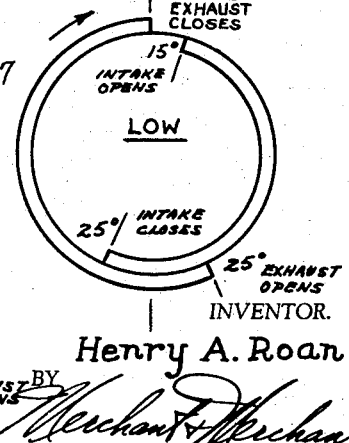
INVENTOR.
Henry A. Roan
BY
Merchant & Merchant
ATTORNEYS United States Patent Office 2,880,711
Patented Apr. 7, 1959

2,880,711
VARIABLE VALVE TIMING MECHANISM FOR ENGINES

Henry A. Roan, Minneapolis, Minn.

Application February 5, 1958, Serial No. 713,432

14 Claims. (Cl. 123—90)

My present invention relates generally to improvements in valve trains for engines and more particularly to variable valve timing mechanism for engines of the overhead valve type wherein the valves are mounted in the cylinder head of an engine, and wherein the valve stems extend generally longitudinally outwardly with respect to the engine cylinder.

It is well known among those skilled in the art, that a given valve timing best suitable for high engine speed is highly unsuitable for best operating efficiency of the engine at low or idling speed, and conversely, that the best valve timing for low speed engine operation is relatively poor for high speed engine operation. Hence, a fixed compromise valve timing arrangement is generally used which is most efficient in the moderate or intermediate speed range. Usually, with this arrangement, operating efficiency in the idling or low speed range, as well as that of the highest speed range, is sacrificed.

An important object of my invention is the provision of novel means for varying the valve timing of engines of the overhead valve type to the end that such engines will operate with equal efficiency over the entire speed range.

Another object of my invention is the provision of a novel cam engaging element mounted for common movements with the valve actuating rocker arm of an overhead valve engine and for shifting movements with respect to the rocker arm whereby the valve operating cam will engage the cam engaging element at angularly spaced points circumferentially of the direction of movement of the cam to vary the time of opening and closing of the valve.

Another object of my invention is the provision of a valve actuating train as set forth including an oscillating cam having a lobe which moves into and out of engagement with a working face on the cam engaging member to cause opening and closing of the valve, said oscillating cam being operatively coupled to a motor driven rotary cam whereby rotation of the rotary cam will impart oscillatory movement to said oscillating cam.

Another object of my invention is the provision of a valve train as set forth including a rocker arm having arcuate guide means thereon and a cam engaging element mounted on the guide means for common rocking movements with the rocker arm and for shifting movement on the arcuate guide means in an arcuate path substantially about the axis of movement of the cam.

Another object of my invention is the provision of variable valve timing mechanism as set forth, which can be installed on engines of the overhead valve type with relative ease and with a minimum of alteration to the engine structure.

The above, and still further highly important objects and advantages of my invention, will become apparent from the following detailed specification, appended claims and attached drawings.

Referring to the drawings, which illustrate the invention, and in which like reference characters indicate like parts throughout the several views:

Fig. 2 is an enlarged fragmentary view in plan of a pair of valve operating rocker arms of the engine of Fig. 1;

Fig. 3 is a fragmentary view partly in side elevation and partly in section, taken substantially on the line 3—3 of Fig. 2;

Fig. 4 is a view corresponding to a portion of Fig. 2, but showing a modified form of my invention;

Fig. 5 is a fragmentary view partly in section and partly in elevation as seen from the line 5—5 of Fig. 4;

Fig. 6 is a view corresponding to Fig. 5 but showing a different position of some of the parts;

Fig. 7 is a fragmentary view in elevation as seen from the left to the right with respect to Fig. 6; and Figs. 8, 9 and 10 are diagrams showing the valve timing obtained by my invention at high, medium and low engine speeds respectively.

Figure 1:
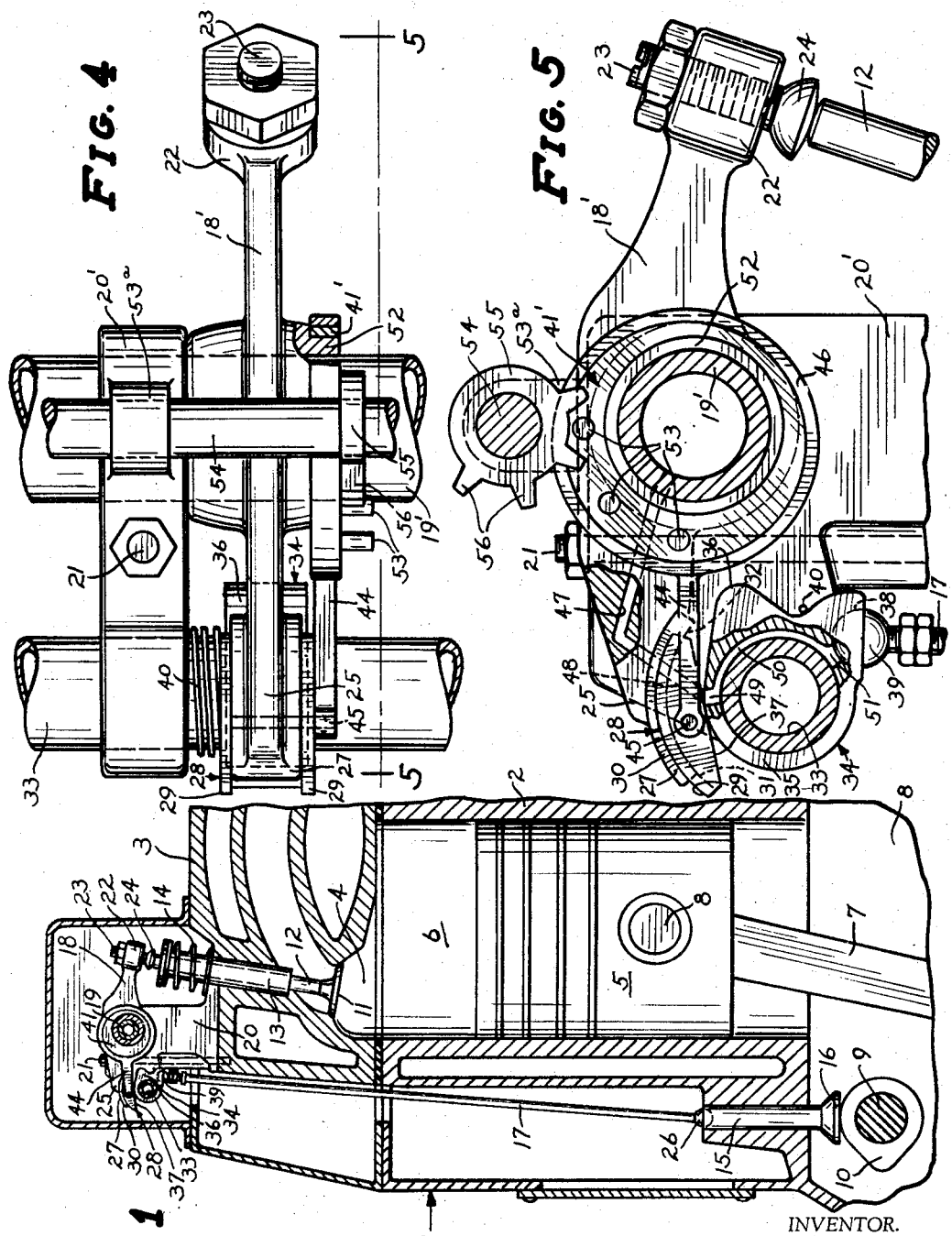
Fig. 1 is a fragmentary view in section of a portion of a conventional internal combustion engine of the overhead valve type, showing my invention installed in the valve train of one of the valves thereof.

In the preferred embodiment of my invention illustrated in Figs. 1-3 inclusive, the numeral 1 indicates, in its entirety, an internal combustion engine comprising a block 2, a cylinder head 3, defining a combustion chamber 4, a piston 5 mounted for reciprocating movements in a cylinder 6 defined by the block 2, a connecting rod 7 pivotally secured to the piston 5 by means of a conventional wrist pin or the like 8 and which may assume to be connected at its lower end to the usual crank shaft, not shown, but contained within a crank case 8, and an engine driven cam shaft 9 which carries a plurality of valve actuating cams 10, one of which is shown. The engine further includes a pair of valves 11, one of which is shown, the same being of the poppet type, each having a valve stem 12 mounted in a valve guide 13 and yieldingly urged toward a valve closed position by a coil compression spring 14. The valve 11 is actuated by the cam 10 through a valve actuating train including, a tappet 15 slidably mounted in the engine block 2 and having a cam engaging head 16, a push rod 17, and a rocker arm 18. Two such rocker arms 18 are illustrated in Fig. 2, there being usually one for each valve of a given cylinder of the engine. The rocker arms 18 are journalled intermediate their ends on a tubular shaft 19 that preferably extends longitudinally of the engine 1, and which in turn is journalled at spaced intervals in supporting members 20, one of which is shown, the same being rigidly secured to the top of the cylinder head 3 by means of a nut equipped bolt or stud 21. Each rocker arm 18 is provided at one end with a head portion 22 in which is screw threaded a lock nut equipped screw 23 the head 24 of which abuts the upper end of the stem 12 of its respective valve 11. In the usual arrangement, not shown, the upper end of the push rod 17 has ball and socket engagement with the opposite end portion 25 of the rocker arm 18, the lower end of the push rod 17 operatively engaging the upper end of the tappet 15 substantially as indicated at 26 in Fig. 1.

The end portion 25 of each rocker arm 18 is formed to provide arcuate guide means in the nature of a generally segmental foot 27 which slidably receives a cam engaging element in the nature of a shoe 28 having bending side flanges 29 that slidably engage adjacent side faces 30 of the foot 27 to hold the shoe 28 against lateral movement with respect to the foot 27. Intermediate the flanges 29, the shoe 28 defines an arcuate surface 31 which corresponds to the arcuate bottom surface 32 of the foot 27.

Journalled on a tubular shaft 33 in spaced parallel relation to the shaft 19 are oscillating cams 34, one underlying each of a different one of the shoes 28. The shaft 33 is rigidly mounted on each supporting member 20, each of the oscillating cams 34 having a heel or dwell portion 35 and a lobe 36 which work against the flat bottom or working face 37 of the overlying shoe 28. Each oscillating cam 34 is further formed to provide a socket 38 which receives a ball element 39 adjustably mounted on the upper end of the push rod 17, and a torsion spring 40 anchored at one end to the supporting member 20 and having its opposite end engaging the adjacent oscillating cam 34, yieldingly urges its respective cam 34 toward its respective push rod 17.

It will be noted, particularly with reference to Fig. 3, that the arcuate guide surface 32 of the foot 27 and the cooperating upper surface 31 of the shoe 28 define an arc the center of which is substantially the axis of the tubular cam carrying shaft 33 when the working face 37 of the shoe 28 is in engagement with the heel portion 35 of the oscillating cam 34. Means for bodily shifting each shoe 28 with respect to its cooperating foot 27 comprises an eccentric element 41 rigidly mounted on the tubular control shaft 19 for common rotation therewith, by means of a key 42 and a set screw 43. Said shifting means further comprises a control arm 44 pivotally connected at its outer end to a shifting pin 45 projecting laterally outwardly from the one side of the shoe 28, said arm 44 at its inner end defining a circular loop portion 46 that is journalled on the outer peripheral surface of the eccentric element 41. The tubular shaft 19 may be assumed to be operatively coupled to other well known control mechanisms, such as the throttle linkage or a governor not shown, whereby the shaft 19 and eccentric element 41 are partially rotated independently of the movement of the rocker arm 18, to impart arcuate shifting movement to the cam engaging shoe 28 to a given position with respect to the lobe 36 of the oscillating cam 34. The shaft 19 may be assumed to carry suitable lubricant, which is fed through a passage in the rocker arm 18 said passage being shown by dotted lines and indicated by the reference character 47, said passage 47 being alignable with a cooperating passage 48 in the shoe 28, said passage 48 being shown by dotted lines in Fig. 3, whereby the surfaces 31 and 32 between the foot 27 and shoe 28 may be lubricated, lubricant moving through the passage 48 collecting on the working face 37 of the shoe 28 and the adjacent surface portions of the oscillating cam 34. Some of the lubricant on said surfaces of the oscillating cam 34 flows inwardly through an opening 49 in the oscillating cam 34 and through an arcuate passage 50 therein to lubricate the connection between the cam 34 and its mounting shaft 33. As seen in Fig. 3, the lower end of the arcuate passage 50 communicates with the socket 38 whereby to lubricate the ball 39, as indicated at 51.

In the modified arrangement illustrated in Figs. 4–7 inclusive, the valve stem, push rod, cam engaging shoe and its cooperating foot, oscillating cam, and its supporting shaft are identical to those of the preferred arrangement or Figs. 1–3, and carry identical reference characters. Other parts, slightly modified, are indicated by like reference numerals as their corresponding parts of Figures 1–3, with prime marks added. Thus, in the modified arrangement, the supporting member 20' carries tubular shafts 19' and 33, the rocker arm 18' being journalled on the shaft 19' for rocking movements relative thereto. The eccentric element 41' is shown as being journalled on a hub portion 52 of the rocker arm 18', said eccentric element 41' being provided with a plurality, as shown three, of circumferentially spaced pins 53 which project in a common direction axially outwardly from one side of the eccentric element 41'. The supporting member 20' is formed to provide an upstanding bearing boss 53a at its upper end, said bearing boss journalling a control shaft 54 which has mounted thereon a control member 55 provided with circumferentially spaced teeth 56. The teeth 56 engage the pins 53 to impart rotary adjusting movement to the eccentric element 41', the spacing of the teeth 56 permitting limited rocking movement of the eccentric element 41' in common with the rocker arm 18', so that a given adjustment of the eccentric element 41' and the cam engaging shoe 28 adjustably movement thereby is not affected by rocking movement of the rocker arm 18'. The control shaft 54 may be assumed to be operatively connected to suitable control means, not shown, and be operated in the same manner as the shaft 19 of Figs. 1–3, to move its shoe 28 in its arcuate path of the shifting movement as above described.

When the engine 1 is running at low operating speed, each cam engaging shoe 28 is positioned as shown in Figs. 1–5. With the shoes thus positioned, the oscillating cam partakes of a predetermined rotary movement through a relatively wide angle toward the shoes 28 before the lobes 36 make lifting contact with the flat working surfaces 37 of their respective shoes 28. In other words, the tappets 15 and push rods 17 are moved by their respective cams 10 to a predetermined extent before their respective rocker arms 18 are affected thereby. When the lobes of the cams 10 begin to rotate away from their respective tappets 15, each oscillating cam 34 follows its respective push rod to cause its lobe 36 to move away from engagement with its respective shoe 28 until the working surface 37 of each shoe 28 again engages the heel or dwell portion 35 of the underlying oscillating cams 34, each cam 34 continuing to oscillate to its limit of oscillatory movement shown in Figs. 3, 5 and 6. With the shoes 28 thus positioned, the valve timing is such that the intake and exhaust valves are open for a minimum portion of each operating cycle of the engine. The valve timing obtained with the shoes 28 in their positions of Figs. 3 and 5 is illustrated diagrammatically in Fig. 10. During operation of the engine at medium speeds, the eccentric elements 41 or 41' are caused to move in a clockwise direction with respect to Figs. 3 and 5 to position the shoes 28 intermediate their positions of Figs. 3 and 5 and their positions illustrated in Fig. 6. With the shoes 28 thus positioned, each oscillating cam 34 partakes of a lesser amount of angular movement about the axis of the supporting shaft 33, prior to engagement of the working surfaces 37 by their respective cam lobes 36. Inasmuch as lifting movement imparted to the push rods 17 by the cams 10 is uniform at all times, the above described intermediate positioning of the cam engaging shoes 28 will result in a somewhat longer valve open interval as illustrated diagrammatically in Fig. 9. Further, when the eccentric elements 41 or 41' are moved to a position as shown in Fig. 6, and their respective cam engaging shoes 28 positioned accordingly, their respective cams 34 partake of a minimum of angular or oscillatory movement in a valve opening direction before the lobes 36 thereof engage the working faces 37 of the shoes 28 to cause opening of the valves. With the shoes 28 thus positioned, the valves 11 are open for a maximum length of time for each operating cycle, as illustrated in Fig. 8, to provide the most efficient valve timing for high speed operation.

With reference to the diagram of Fig. 10, it will be seen that at low engine speeds, by using my novel variable valve timing mechanism, the intake valves are caused to close at approximately 25° beyond bottom center. This timing provides for a longer than normal effective compression stroke to materially raise the compression of the gases within the cylinder. Further, the exhaust valves are opened closer to the end of the power stroke than at medium or high speed engine operation. This combination of a long effective compression stroke and longer than normal power stroke has been found to result in substantially higher torque at low engine speeds than has heretofore been obtained in a given four cycle internal combustion engine. Moreover, by varying the valve timing between the low and high speed operating conditions, as indicated in the diagrams of Figs. 8–10, I have been able to provide for the most efficient valve timing for all engine speeds. By varying the valve timing according to engine speeds, I have been able to effect an appreciable savings in fuel, inasmuch as the engine runs efficiently with a leaner air-gas mixture than heretofore.

While I have shown and described a commercial embodiment of my novel variable valve timing mechanism, and a single modification thereof, it will be understood that further modification may be made without departure from the spirit and scope of the invention, as defined in the claims.

What I claim is:

1. In an engine, a valve, a valve actuating cam and valve actuating connections between said valve and the cam, said valve actuating connections including a rocker arm pivotally mounted on the engine and having one portion operatively engaging said valve, an adjustable cam-engaging element mounted for common movements with said rocker arm and for independent shifting movements relative thereto substantially about the axis of movement of said cam, said cam-engaging element having a working face directed toward said cam, said cam having a lobe movable circumferentially into and out of engagement with said working face of the cam-engaging element, and mechanism for adjustably shifting said cam-engaging element with respect to said rocker arm, whereby said lobe initially engages said working face of the cam-engaging element at different angularly spaced points of circumferential movement of said cam lobe.

2. In an engine, a valve, a valve actuating cam and valve actuating connections between said valve and the cam, said valve actuating connections including a rocker arm pivotally mounted on the engine and having one portion operatively engaging said valve, arcuate guide means on another portion of said rocker arm, an adjustable cam-engaging element mounted on said rocker arm for common movements therewith and in sliding engagement with said arcuate guide means for independent shifting movements relative to said rocker arm, said cam-engaging element having a working face directed toward said cam, said cam having a lobe movable circumferentially into engagement with said working face of the cam-engaging element, and mechanism for adjustably shifting said cam-engaging element on said arcuate guide means substantially about the axis of movement of said cam, whereby said lobe initially engages said working face of the cam-engaging element at different angularly spaced points of circumferential movement of said cam lobe.

3. In an engine, a valve, a valve actuating cam and valve actuating connections between said valve and the cam, said valve actuating connections including a rocker arm pivotally mounted at its intermediate portion on the engine, one end of said rocker arm operatively engaging said valve, arcuate guide means on the other end portion of said rocker arm, an adjustable cam-engaging element mounted on said rocker arm for common movements therewith and in sliding engagement with said arcuate guide means for independent shifting movements relative to said rocker arm, said cam-engaging element having a working face directed toward said cam, said cam having a lobe movable circumferentially into engagement with said working face of the cam-engaging element, and mechanism for adjustably shifting said cam-engaging element on said arcuate guide means substantially about the axis of movement of said cam, whereby said lobe initially engages said working face of the cam-engaging element at different angularly spaced points of circumferential movement of said cam lobe.

4. The structure defined in claim 3 in which said mechanism for adjustably shifting said cam-engaging element comprises a rotary shaft, an eccentric element operatively coupled to said shaft to be rotated thereby, and a control arm connected to said eccentric element and to said cam-engaging element to impart adjusting shifting movements to said cam-engaging element responsive to rotation of said rotary shaft and eccentric element.

5. The structure defined in claim 4 in which said rotary shaft provides a journal for pivotal mounting of said rocker arm, said eccentric element being mounted fast on said rotary shaft for common movements therewith.

6. The structure defined in claim 4 in which said eccentric element and rocker arm are mounted for independent movements on a common axis, said rotary shaft being disposed in spaced parallel relation to said axis and having circumferentially spaced teeth engaging spaced portions of said eccentric element to impart pivotal movement to said eccentric element.

7. In an engine, a valve, a rotary valve actuating cam and valve actuating connections between said rotary cam and valve, said valve actuating connections including a rocker arm pivotally mounted on the engine and having one portion operatively engaging said valve, an oscillating cam mounted for oscillatory movements toward and away from another portion of said rocker arm, means engaging said rotary cam and imparting oscillatory movements to said oscillating cam responsive to rotation of said rotary cam, an adjustable cam-engaging element mounted for common movements with said rocker arm and for independent shifting movements relative thereto substantially about the axis of movement of said oscillating cam, said cam-engaging element having a working face directed toward said oscillating cam, said oscillating cam having a lobe movable circumferentially into and out of engagement with said working face of the cam-engaging element, and mechanism for adjustably shifting said cam-engaging element with respect to said rocker arm, whereby said lobe initially engages said working face of the cam-engaging element at different angularly spaced points of circumferential movement of said cam lobe.

8. In an engine, a valve, a rotary valve actuating cam and valve actuating connections between said rotary cam and valve, said valve actuating connections including a rocker arm pivotally mounted on the engine and having one portion operatively engaging said valve, an oscillating cam mounted for oscillatory movements toward and away from another portion of said rocker arm, means engaging said rotary cam and imparting oscillatory movements to said oscillating cam responsive to rotation of said rotary cam, arcuate guide means on said rocker arm, an adjustable cam-engaging element mounted on said rocker arm for common movements therewith and in sliding engagement with said arcuate guide means for independent shifting movements relative to said rocker arm, said cam-engaging element having a flat working face directed toward said oscillating cam, said oscillating cam having a lobe movable circumferentially into engagement with said working face of the cam-engaging element, and mechanism for adjustably shifting said cam-engaging element on said arcuate guide means substantially about the axis of oscillatory movement of said oscillating cam, whereby said lobe initially engages said working face of the cam-engaging element at different angularly spaced points of circumferential movement of said cam lobe.

9. The structure defined in claim 8 in which said means engaging said rotary cam comprises a reciprocating member mounted in said engine for straight line reciprocatory movements and a push rod interposed between said reciprocating member and said oscillating cam.

10. In an engine, a valve, a rotary valve actuating cam and valve actuating connections between said rotary cam and valve, said valve actuating connection including a rocker arm pivotally mounted at its intermediate portion on said engine, one end of said rocker arm operatively engaging said valve, arcuate guide means on the other end of said rocker arm, an oscillating cam, means mounting said oscillating cam for oscillatory movements about an axis generally parallel to the axis of rocking movement of said rocker arm toward and away from said arcuate guide means, means engaging said rotary cam and imparting oscillatory movements to said oscillating cam responsive to rotation of said rotary cam, an adjustable cam-engaging element mounted on said rocker arm for common movements therewith and in sliding engagement with said arcuate guide means for independent shifting movements relative to said rocker arm, said cam-engaging element having a flat working face directed toward said oscillating cam, said oscillating cam having a lobe movable circumferentially into engagement with said working face of the cam engaging element, and mechanism for adjustably shifting said cam-engaging element on said arcuate guide means substantially about the axis of oscillatory movement of said oscillating cam, whereby said lobe initially engages said working space of the cam-engaging element at different angularly spaced points of circumferential movement of said cam lobe.

11. The structure defined in claim 10 in which said means engaging said rotary cam comprises a reciprocatory member mounted on said engine for straight line reciprocatory movements and a push rod interposed between said reciprocating member and said oscillating cam, and in further combination with yielding means urging said oscillating cam in one direction of its oscillatory movement toward said push rod.

12. The structure defined in claim 11 in which said mechanism for adjustably shifting said cam-engaging element comprises a rotary shaft, an eccentric element operatively coupled to said shaft to be rotated thereby, and a control arm connected to said eccentric element and to said cam-engaging element to impart adjusting shifting movements to said cam-engaging element responsive to rotation of said rotary shaft and eccentric element.

13. The structure defined in claim 11 in which said mechanism for adjustably shifting said cam-engaging element comprises a rotary shaft on which said rocker arm is journalled for rocking movements, an eccentric element mounted fast on said rotary shaft for common rotation therewith, and a control arm connected to said eccentric element and to said cam-engaging element to impart adjusting shifting movements to said cam-engaging element responsive to rotation of said rotary shaft and eccentric element.

14. The structure defined in claim 11 in which said eccentric element and rocker arm are mounted for independent movement on a common axis, said rotary shaft being disposed in spaced parallel relation to said axis and having circumferentially spaced teeth engaging spaced portions of said eccentric element to impart pivotal movement to said eccentric element, said teeth being spaced apart sufficiently to permit limited independent pivotal movement of said eccentric element in common with said rocker arm.

References Cited in the file of this patent

UNITED STATES PATENTS

| | | |
|---|---|---|
| 2,565,022 | Hattink | Aug. 21, 1951 |
| 2,772,667 | Nallinger | Dec. 4, 1956 |